US008756487B2

(12) United States Patent
Weitzman et al.

(10) Patent No.: US 8,756,487 B2
(45) Date of Patent: Jun. 17, 2014

(54) SYSTEM AND METHOD FOR CONTEXT SENSITIVE CONTENT MANAGEMENT

(75) Inventors: Louis M. Weitzman, Brookline, MA (US); Dikran S. Meliksetian, Danbury, CT (US)

(73) Assignee: International Business Machines Corporation, Armonk, NY (US)

(*) Notice: Subject to any disclaimer, the term of this patent is extended or adjusted under 35 U.S.C. 154(b) by 653 days.

(21) Appl. No.: 10/752,476

(22) Filed: Jan. 6, 2004

(65) Prior Publication Data

US 2005/0149862 A1 Jul. 7, 2005

(51) Int. Cl.
*G06F 17/20* (2006.01)
*G06F 17/21* (2006.01)

(52) U.S. Cl.
USPC ......................................................... 715/200

(58) Field of Classification Search
USPC .......... 715/522, 513, 234–239, 248–250, 200
See application file for complete search history.

(56) References Cited

U.S. PATENT DOCUMENTS

| | | | |
|---|---|---|---|
| 6,192,382 B1 | 2/2001 | Lafer et al. | |
| 6,249,844 B1 | 6/2001 | Schloss et al. | |
| 6,282,564 B1 | 8/2001 | Smith et al. | |
| 6,453,357 B1 | 9/2002 | Crow et al. | |
| 6,476,833 B1* | 11/2002 | Moshfeghi | 715/854 |
| 6,507,857 B1* | 1/2003 | Yalcinalp | 715/513 |
| 7,131,066 B1* | 10/2006 | Birsan et al. | 715/206 |
| 7,171,618 B2* | 1/2007 | Harrington et al. | 715/517 |
| 8,200,702 B2* | 6/2012 | Herbeck et al. | 707/791 |
| 2002/0029229 A1 | 3/2002 | Jakopac et al. | |
| 2002/0152244 A1 | 10/2002 | Dean et al. | |
| 2002/0161915 A1 | 10/2002 | Crow et al. | |
| 2002/0169688 A1 | 11/2002 | Kasai | |
| 2002/0199170 A1 | 12/2002 | Jameson | |
| 2003/0028557 A1 | 2/2003 | Walker et al. | |
| 2003/0037076 A1* | 2/2003 | Bravery et al. | 707/517 |
| 2003/0060284 A1 | 3/2003 | Hamalainen et al. | |
| 2003/0069881 A1 | 4/2003 | Huttunen | |
| 2003/0221170 A1* | 11/2003 | Yagi | 715/517 |
| 2004/0054569 A1* | 3/2004 | Pombo et al. | 705/7 |
| 2004/0133848 A1* | 7/2004 | Hunt et al. | 715/500 |
| 2004/0181543 A1* | 9/2004 | Wu et al. | 707/102 |
| 2005/0159136 A1* | 7/2005 | Rouse et al. | 455/412.1 |
| 2006/0014523 A1* | 1/2006 | Reilly | 455/412.1 |
| 2006/0031749 A1* | 2/2006 | Schramm et al. | 715/500.1 |

OTHER PUBLICATIONS

Nakano, Tadashi, et al. "User Adaptive Content Delivery Mechanism on the World Wide Web", ACM Press, Symposium on Applied Computing, Proceedings of the 2002 ACM symposium on Applied Computing, pp. 1140-1146, 2002.*
Jensen, K.; Zadrozny, W., "Method for Automatic Extraction of Topics in Expository Prose," IBM Technical Disclosure Bulletin, vol. 32, No. 8A, Jan. 1990, pp. 395-397.

* cited by examiner

*Primary Examiner* — James J Debrow
(74) *Attorney, Agent, or Firm* — Fleit Gibbons Gutman Bongini & Bianco PL; Thomas Grzesik

(57) ABSTRACT

A content management system (100) includes a plurality of devices (110) communicatively coupled to a content server (105). Each of the plurality of devices (125,135) has a context (130,140) associated with it. The content server (105) includes a content processor (115) and stores a plurality of content (150). The content processor (115) is adapted to receive a request for at least one context (120) from one of the plurality of devices (110); extract at least one context related information created from composed fragments from the request; and generate a context-based content (145) using the extracted at least one context related information.

29 Claims, 6 Drawing Sheets

```
<?xml version="1.0" encoding="UTF-8"?>
<Context>
<Requestor name="John Doe">
<Audience category="analyst"></Audience>
</Requestor>
<Device name="Palm m515"></Device>
<Encodings>
...
</Encodings>
...
</Context>
```

Context Document example

FIG. 3

```
<?xml version="1.0" encoding="UTF-8"?>
<Device name="Motorola V60i" category="cell phone">
<Screen height="96" width="64" color="black and white">
<Text lines="3" />
</Screen>
...
</Device>
```

Device description for a wireless phone

FIG. 4

```
<?xml version="1.0" encoding="UTF-8"?>
<Device name="Palm m515" category="handheld">
<Screen height="160" width="160" color="65000"></Screen>
...
</Device
```

Device description for a handheld device

FIG. 5

```
<?xml version="1.0" encoding="UTF-8"?>
<Constraints>
<Text>
<Title required="true" maxChars="100" maxLines="1"/>
<Abstract required="false" allowed="true" maxLines="3" maxChars="300"/>
<Body required="true" paragraphsAllowed="true" macChars="1000">
...
</Body>
</Text>
<Images numallowed="1" colorDepth="65000">
<Image allowedPosition="upper-left" maxheight="32" maxwidth="16"/>
</Images>
...
<InterestAreas>
<Computing tag="grid computing"/>
<Business tag="on-demand environment"/>
</InterestAreas>
</Constraints>
```

Example of a Constraint Document

FIG. 6

SYSTEM AND METHOD FOR CONTEXT SENSITIVE CONTENT MANAGEMENT

FIELD OF THE INVENTION

The present invention generally relates to the field of content management systems and methods, and more particularly relates to a content management system and method having context-based document composition and rendering.

BACKGROUND OF INVENTION

Some content management systems in use today incorporate the concept of separation of content and style. This separation simplifies the maintenance of the system and provides a separation of the roles of content creators and style designers. Separation of content from the design simplifies maintenance of both the content and the design. Each is controlled separately and can be authored by people with the appropriate skill sets. As the content evolves, authors of that content can modify the fragments of information. As the design evolves, designers responsible for the look and feel can modify the style sheets that embody the design. Thus, design rules are encoded and stored centrally thereby increasing the integrity of the overall design strategy. Such approaches facilitate a strong and consistent brand across the published information. This separation of content and design also eases the delivery of content to new devices. Each new device represents a new set of style sheets while the content remains unaffected.

Modern content management systems also build on the concept of content fragments, where fragments are pieces of reusable content that can be used in multiple documents, pages or any artifacts that are managed by the system. In most cases those fragments are represented as XML (Extensible Markup Language) or HTML (Hypertext Markup Language) constructs. Users of the content management system select a subset of those fragments to construct artifacts that are targeted for a certain modality of delivery and presentation and customized for a certain category of recipients.

With a fragment-based system, there is no limit to the ability to reuse the information. When properly tagged, content can be reused for customization to different audience segments as well as different devices. However, along with this reuse comes the need to effectively update dependent content and design fragments. A system that takes this approach, must also maintain dependencies for automatic and efficient updates. This intelligent updating of content also applies to the updating of the display designs for the data. The dependency on a particular style sheet is maintained and when that asset changes, the dependent pages are automatically updated. A drawback to this approach is that a change in one style sheet or one content asset may trigger the republishing of a major portion of the site which can be a time consuming operation. Therefore, care is taken to only include relevant information in fragments or style sheets that are used across many pages.

One of the problems with fragment-based systems is that the definition of each fragment can take into consideration only the uses that are contemplated for that type of fragment at the time of fragment definition. Since it is not typically possible to know, a priori, all the possible use scenarios, when new uses arise, there is the need to modify the fragment definition. A change of fragment definitions requires a change to the corresponding style sheets in order to enable the presentation of the fragment in the new contexts without disturbing their presentation in the preexisting contexts.

It is beneficial for such tools, and the designers who use them, to be able to easily adapt to an environment of continuous improvement and change. For example, designers cannot be present at all times to create each presentation. Likewise, systems must support the design process to ensure the consistent and timely presentation of information. Therefore a need exists to overcome the problems with the prior art as discussed above.

SUMMARY OF THE INVENTION

According to the present invention, a system and method for attaching contextual information to content and design is provided. The present invention provides a system and method to associate contextual information to content. The presentation of content in a given context can then take into consideration this contextual information to render the content in the selected style. Addition of new contexts and constraints of presentation environments to an existing system will have minimal impact on existing content and styles improving both the extensibility and maintainability of the system. It will necessitate only addition of new style sheets and constraint descriptions that act on the existing content based on the specified context.

BRIEF DESCRIPTION OF THE DRAWINGS

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

The present invention will be described by way of exemplary embodiments, but not limitations, illustrated in the accompanying drawings in which like references denote similar elements, and in which:

FIG. 3 illustrates one example of a context document for use within the content management system of FIG. 1.

FIGS. 4 and 5 illustrate various examples of device description documents for use within the content management system of FIG. 1.

FIG. 6 illustrates one example of a constraint document for use within the content management system of FIG. 1.

DETAILED DESCRIPTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as at least one or more than one. The term plurality, as used herein, is defined as two, or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a information processing circuit. A program, computer program, or software application may include a subroutine, a function, a procedure, an object method, an object implementation, an executable application, an applet, a servlet, a source code, an object code, a shared library/dynamic load library and/or other sequence of instructions designed for execution on a information processing circuit.

Figure 1:
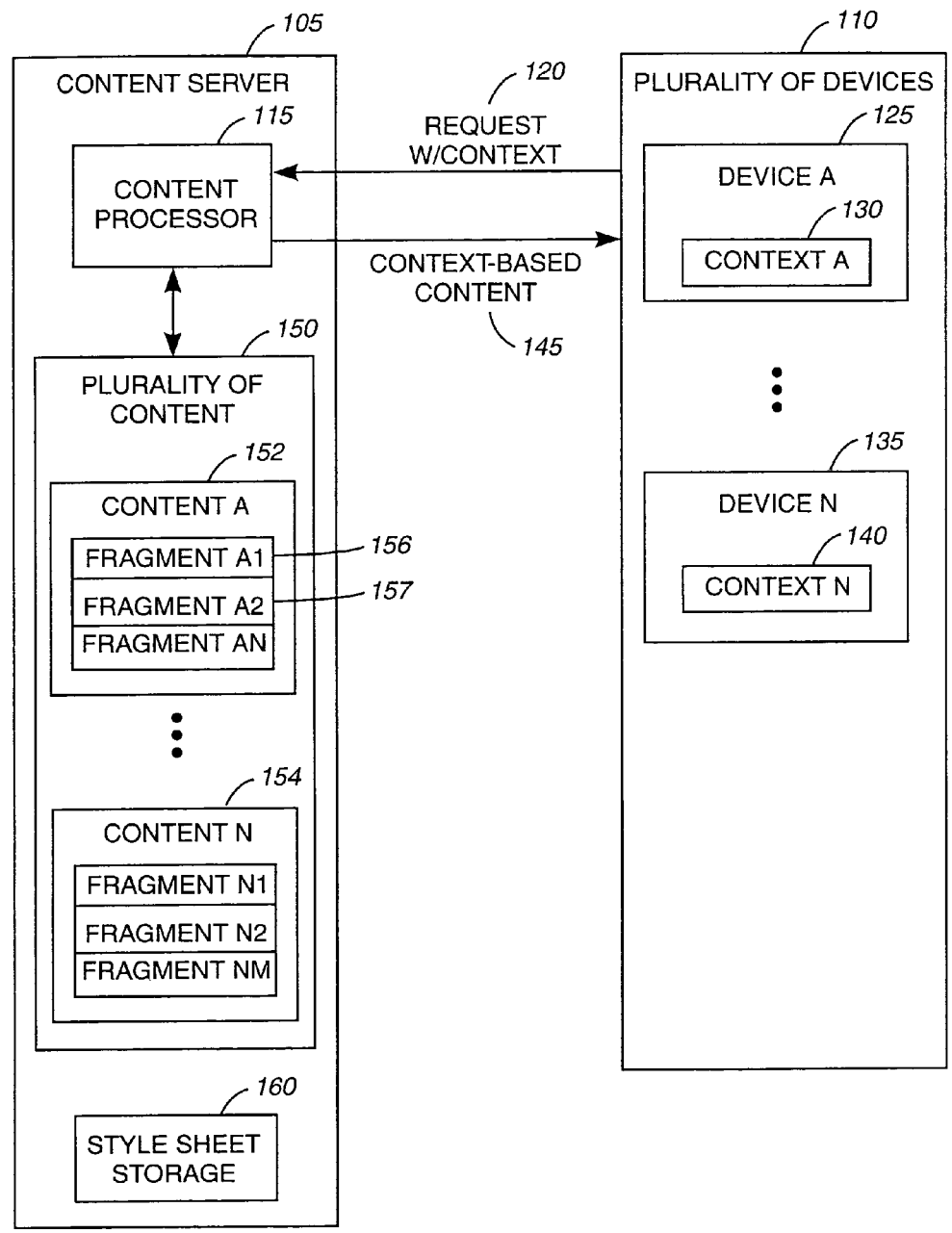
FIG. 1 is an electronic block diagram of a system for content management.

FIG. 1 illustrates a content management system 100 according to an exemplary embodiment of the present invention. The content management system 100 includes a content server 105 and a plurality of devices 110. It will be appreciated by those of ordinary skill in the art that each of the plurality of devices 110 can be a cellular telephone, a messaging device, a personal digital assistant, a computer, a personal workstation, a website, and the like. Each of the plurality of devices 110 in this example has a context associated with it. For example, a first device 125 can have a first context 130 while a second device 135 can have a second context 140, which is able to differ from the first context 130. The different contexts for the different devices put different constraints on the display and presentation of the content information (e.g., specifications of constraints relating to limited display area for the elements, a black and white or color display, etc). The context for a device can further include, for example, a specification of processing capacity of the device, display viewing area of the device, color vs. black and white display, a device use associated with of the device, such as use as a phone or office workstation, and the like.

The content server 105 preferably includes a content processor 115 for receiving and processing requests for content 120. The processing requests are received from one or more of the plurality of devices 110 in this example. Each request for content 120, in accordance with the present invention, includes information relating to a context that can be associated with the requesting device.

The content server 105 of the exemplary embodiment includes storage for a plurality of content 150. Each content definition, such as content A 152 and content N 154, contains information that is provided in responses to requests for content 120.

The content server 105 of the exemplary embodiment further includes a style sheet storage 160. The style sheet storage 160 stores one or more style sheets that define presentation descriptions or other display formats for the content stored in the plurality of content. The style sheets in the exemplary embodiment are defined as XSL documents. The style sheet storage is able to include one or more style sheets for different display formats. For example, different style sheets are able to be stored that are tailored to either a large screen display format or a small screen display format. Style sheets tailored to display content on large screen display formats are intended to be used to display content on, for example, a personal computer. Style sheets tailored to display content for a small screen display format are intended to be used to display content on, for example, handheld devices.

The processing of the requests for content 120 includes determining a context of the requesting device, and processing one or more of a plurality of content 150 stored within the content server 105 to one or more of the plurality of devices 110 in accordance with the context of the requesting device, and providing a context-based content 145 to the requesting device. The context-based content 145 is the requested content optimized for the requesting device's context.

Each content definition within the plurality of content data 150 can be partitioned into one or more information fragments, such as fragment A1 156, fragment A2 157, and the other fragments that are illustrated. Information fragments are an example of content elements that are provided to requesting devices in the exemplary embodiment. Examples of dividing content definitions into fragments include a content definition for a news article. In such a case, the news article can be partitioned into a story fragment and one or more related images fragments. The story may also be fragmented further into an abstract fragment and a body of the story fragment. In embodiments of the present invention, multiple versions of an abstract or of other fragments can be defined for a particular article. These multiple versions can be tailored for different types of contexts, including small display screens, large display screens, etc. These fragments can also be reused across different contexts and requests.

The content processor 115 is adapted to provide information fragments for reuse in a variety of situations. The content processor takes each of the information fragments stored in the content data 150 and determines a display format for that content processor based upon the context of the requesting device and a selected style sheet for the content data. Determining display format for individual fragments, as opposed to the complete document, simplifies the interface for the content management user. Such methodology provides an easy way to reuse information for a variety of contexts.

A focus of the exemplary embodiments of the present invention is on the use of information stored as data content definitions that are divided into fragments as opposed to the particular implementations (e.g., XML & XSL (Extensible Stylesheet Language)). The content processor 115 uses the context from the request for content to identify the format for the display of information. The content processor 115 of the exemplary embodiment determines if a fragment is to be used or not, based upon selected style sheets and particular context related information. Based upon the determined context, information fragments can be rendered for display in a slightly different way or not used at all.

Returning to the news article of the previous example. A story fragment may include an abstract of 200 (two hundred) words and a body fragment of much greater length. This volume of data is suitable for presentation on a browser. Presentation of this volume of data on a PDA (Personal Digital Assistant) is better achieved if the abstract is rewritten to accommodate the smaller available screen size (e.g., an abstract that is only 50 (fifty) words long). In such a case, the story abstract fragment can be represented as an element (e.g., an element in the XML file) and another element can also be represent the shortened abstract. These two versions of abstracts are really variations of the same element of the fragment. Upon receiving a request for the story abstract, the content processor 115 identifies which abstract fragment version is best utilized with the context associated with the receiving device. At render-time, the stylesheet references the context objects directly and indirectly refers to the selected data element. In one stylesheet, this reference refers to the long abstract. In another style sheet, this reference refers to the short abstract.

In the above described example, information data fragments play a passive role and are acted upon to build other artifacts. The exemplary embodiments of the current invention describe a methodology to associate the fragments with a sense of context awareness in order to increase the reusability of the fragments and automate the assembly of those fragments to create artifacts targeted for multiple modalities of delivery and presentation. This aspect of the exemplary embodiments of the present invention increases the maintainability and extensibility of the content management system 100.

One exemplary implementation of the proposed approach is in the context of an XML-based web content management system, where context related information is stored as context documents, which are additional XML documents that are associated with the XML documents that contain the content data. Context documents are used by the delivery mechanism, preferably an XSL transformation engine embedded in a Web Application, along with a primary XSL document to render the final web page utilizing the information in the fragments within the context defined by the request.

One exemplary embodiment utilizes XML and XSL within the context of a Web Application. In this preferred embodiment the context itself is represented as another XML document, the Context document that can be either a pure XML document or another XSL document. This context document is used to determine a mapping of the variables referred to in the primary XSL document to Elements and Attributes defined in the content XML document.

Information related to the current context is extracted from the header of a request for a specific set of data. The header of the request in this example specifies, among other things, the type and capabilities of the requesting device, the formats accepted by that device and the preferred language of the requestor. This information is passed to the XSL transformation engine as external parameters.

Before processing the transformation of the Content XML, the XSL transformation engine opens the appropriate Context document and uses the variable mappings specified therein to perform the transformation of data content XML documents. Thus, the primary XSL document can be developed without intimate knowledge of the context mapping and can be written in a generic fashion.

In a simple embodiment, the Context document is a pure XML document, which performs a static mapping of variables to Elements and Attributes, while in a more elaborate embodiment, the Context document is another XSL document that performs a dynamic transformation of the information in the Content XML before the processing the primary XSL document. In still more elaborate embodiment the Context Document can include further "processing instructions." An external engine is able to execute those instructions to order to provide further display tailoring. This last embodiment includes the case where the processing instructions call external web service to perform translation of the value of Elements or Attributes of the data content defined in the Content XML document.

Figure 2:
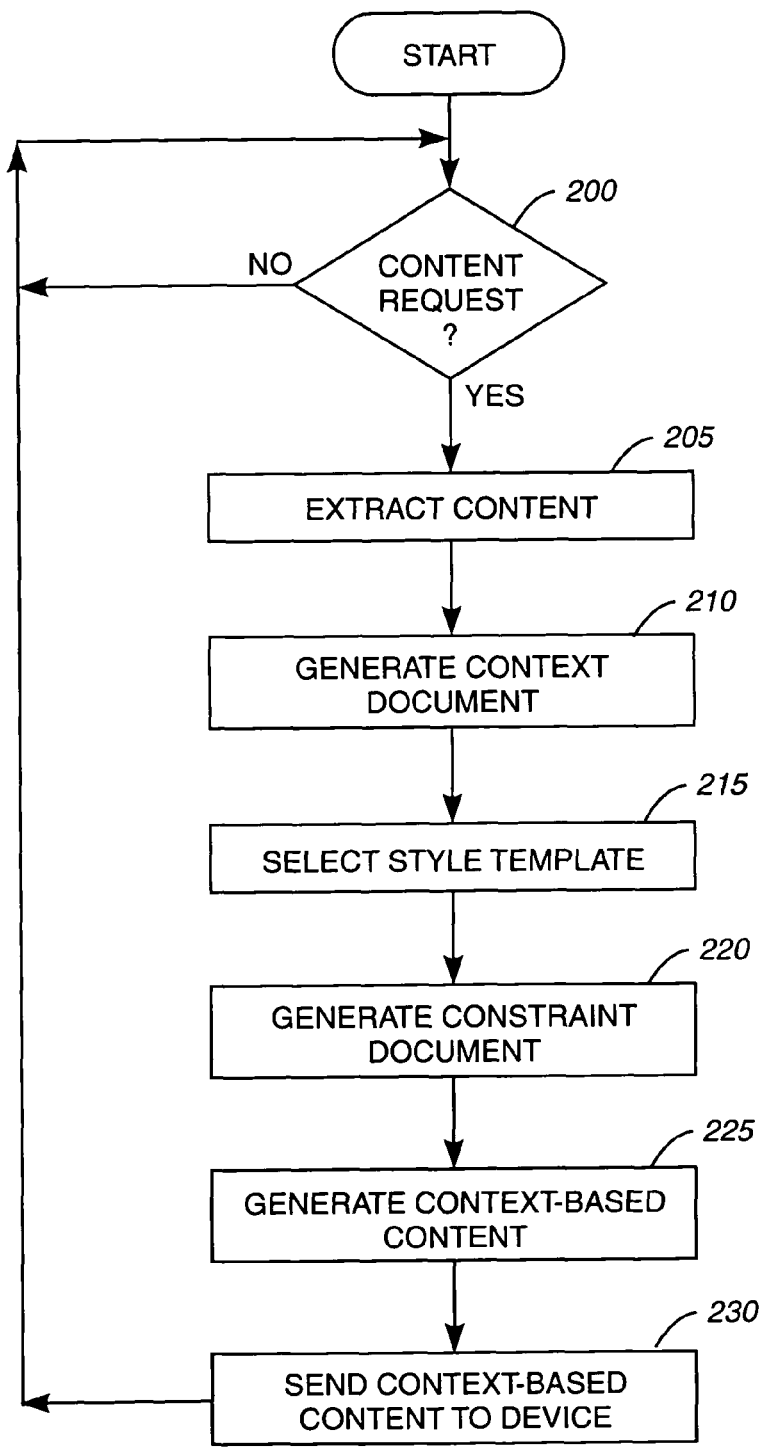
FIG. 2 is a flowchart illustrating one embodiment of the operation of the content management system 100 of FIG. 1

FIG. 2 is a flowchart illustrating the operation of one embodiment of the content management system 100 of FIG. 1. In this example, the description of the operation of FIG. 1, as is illustrated in FIG. 2, is based on using the present invention within a web content management system. It will be appreciated by those of ordinary skill in the art that the operation can be equally applied to any device for content receipt as described herein.

As illustrated in FIG. 2, the operation begins with Step 200 in which a device queries with a request for content. This request can be, for example, a request received by a web hosting system (i.e. the content server 105 of FIG. 1). When no request is received, the operation cycles back and periodically checks for receipt of such a request. When a request for content is received, at Step 200, the operation continues by extracting, at Step 205, context related information from the request. In this exemplary embodiment, one or more portions of the context related information can be described in request headers. In the exemplary web hosting system, the context related information can include, for example, the type of device making the request, the character encodings supported by the software used on the device, and the like. Some of the context related information is also able to be determined by reference to data that is available about the session in which this request is made. For example, if the request were part of an authenticated session, the identity of the requestor can be determined. From this identity information, it is possible to determine additional information, such as the requestor's audience category, user preferences, and the like. Context related information can be further determined based upon business rules that depend upon requesting device data or user data. Next, a context document is generated, at step 210, using this determined context related information. FIG. 3. illustrates one example of a context document. In this example, the context document has an XML representation of context data for a handheld PDA assigned to a particular individual. Identities of individuals can be determined by session information. Further data associating this individual with an audience is stored in the content server 105. The "device" description in this example was determined from information in the header of the content request. Referring back to FIG. 2, the operation continues to Step 215 in which a style sheet template, such as a primary XML document, is selected based on the information of the context document. In typical exemplary embodiments, this template is a style sheet abiding to the XSL syntax. Next, in Step 220, the operation generates a constraint document by processing the context document along with a device description document. One example of a wireless telephone device description document is illustrated in FIG. 4. Similarly, another example of a handheld device description document is illustrated in FIG. 5. These documents expose the capabilities and features of their corresponding devices. The constraints generation mechanism takes into consideration the device characteristics to generate a set of constraints that the output document must satisfy to be properly displayed on the corresponding device, while taking advantage of any special feature that the device might have.

FIG. 6 illustrates one example of a constraint document. The example shows the constraints imposed on the formatted output document for the text portion and any graphics portion of the content. These constraints affect mostly the form/style of the output. The constraints document also contains definitions of constraints to be applied to the content itself. This information is extracted in the exemplary embodiment by processing the context document in conjunction with external business rules. In the example of FIG. 6, these are represented by the <InterestAreas> element.

Figure 7:
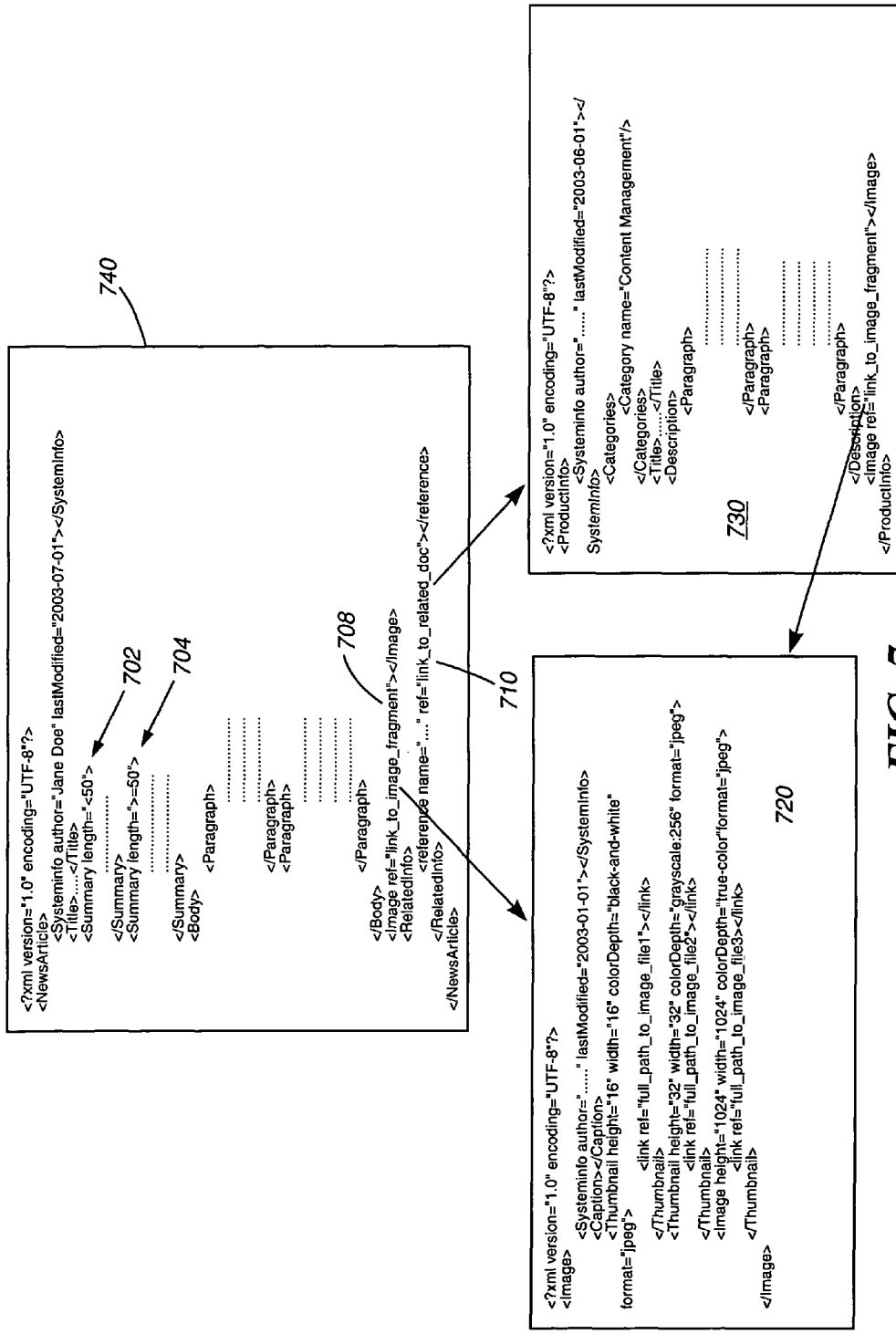
FIG. 7 illustrates one example of a content hierarchy for use within the content management system of FIG. 1.

Referring back to FIG. 2, the operation continues with Step 225 in which the original data content is processed using the selected style sheet in combination with the constraint document to generate a context-based content. Alternate embodiments of the present invention use context related information to modify the selected style sheet in order to produce a modified XSL style sheet to be used to produce a formatted dataset for transmission. In the exemplary embodiment of the present invention, an XSL transformation engine performs this processing. It will be appreciated by those of ordinary skill in the art that the original data content can consist of a hierarchy of fragments. FIG. 7 illustrates one example of such a hierarchy for a hypothetical news article document. The content hierarchy consists of a main fragment 740, which is a news article fragment that references an image fragment 720 and a product information fragment 730. In this example, the product information fragment 730 references the same image fragment 720 as is referenced by the new article of the main fragment 740. The news article fragment 740, among other elements, has two summary elements, a short summary element 702 and a long summary element 704. The short summary element 702 is used to display summary information on smaller displays, such as on a handheld device. The long summary element is used to display longer summaries, with more information, on larger displays, such as on a personal workstation. The image fragment 720 has references to multiple "representations" of the same image, which are identified as "Thumbnail" sections with different dimensions. Each representation of the image is tagged with a description of the characteristics of the referenced image file, such as image size in pixels. The product information fragment is tagged by category information.

In the example under consideration, the XSL transformation of the content data selects the short summary element 702 from the news article fragment to be used to display the abstract information in the output document due to the length constraint on the abstract imposed by the small display of the requesting device. The XSL transformation selects the first image file from the image fragment because of this size constraint and the XSL transformation represents the product information in the display as an external link, since the category designation does not match the interest area tag in the constraint document in this example.

The operation of FIG. 2 continues by transmitting, at step 230, back to the requesting device the context based content, which is properly formatted for the determined context. Thereafter, the operation returns to Step 200 and periodically checks for receipt of another request for content, as is described above.

Figure 8:
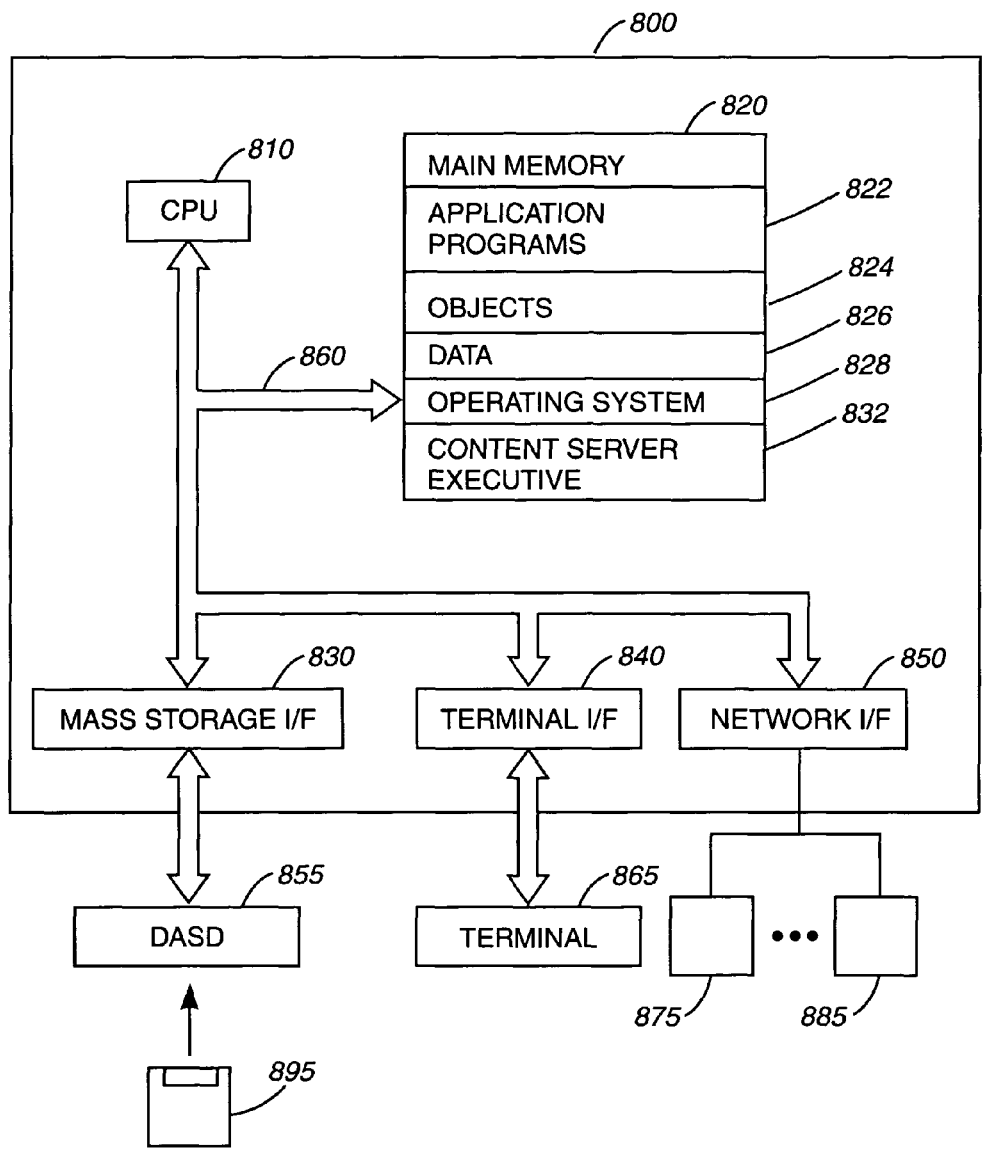
FIG. 8 illustrates a information processing circuit as is used by an exemplary embodiment of the present invention.

A block diagram depicting a group member 800, which is a computer-processing node as used by an exemplary embodiment of the present invention is illustrated in FIG. 8. Any suitably configured processing system can be used by embodiments of the present invention. The information processing circuit 800 has a processor 810 that is connected to a main memory 820, mass storage interface 830, terminal interface 840 and network interface 850. A system bus 860 interconnects these system components. Mass storage interface 830 is used to connect mass storage devices, such as DASD device 855, to the information processing circuit 800. One specific type of DASD device is a floppy disk drive, which may be used to store data to and read data from a floppy diskette 895.

Main Memory 820 contains application programs 822, objects 824, data 826 and an operating system image 828. Although illustrated as concurrently resident in main memory 820, it is clear that the applications programs 822, objects 824, data 826, and operating system 828, are not required to be completely resident in the main memory 820 at all times or even at the same time. Information processing circuit 800 utilizes conventional virtual addressing mechanisms to allow programs to behave as if they have access to a large, single storage entity, referred to herein as a information processing circuit memory, instead of access to multiple, smaller storage entities such as main memory 820 and DASD device 855. Note that the term "information processing circuit memory" is used herein to generically refer to the entire virtual memory of information processing circuit 800.

Operating system 828 is a suitable multitasking operating system. Operating system 828 includes a DASD management user interface program to manage access through the mass storage interface 830. Some embodiments of the present invention utilize architectures, such as an object oriented framework mechanism, that allows instructions of the components of operating system 828 to be executed on any processor within computer 800.

Although only one CPU 802 is illustrated for computer 802, information processing circuits with multiple CPUs can be used equally effectively. Embodiments of the present invention incorporate interfaces that each includes separate, fully programmed microprocessors that are used to off-load processing from the CPU 802. Terminal interface 808 is used to directly connect one or more terminals 818 to information processing circuit 800. These terminals 818, which are able to be non-intelligent or fully programmable workstations, are used to allow system administrators and users to communicate with information processing circuit 800.

Network interface 850 is used to connect other information processing circuits or group members, e.g., Station A 875 and Station B 885, to information processing circuit 800. The present invention works with any data communications connections including present day analog and/or digital techniques or via a future networking mechanism.

Although the exemplary embodiments of the present invention are described in the context of a fully functional information processing circuit, those of ordinary skill in the art will appreciate that embodiments are capable of being distributed as a program product via floppy disk, e.g. floppy disk 895, CD ROM, or other form of recordable media, or via any type of electronic transmission mechanism.

The main memory 820 of the exemplary computing system node 800 contains a content server executable software 832. The content server executable software 832 implements processing for the content management system discussed herein.

The present invention can be realized in hardware, software, or a combination of hardware and software. A system according to a preferred embodiment of the present invention can be realized in a centralized fashion in one information processing circuit, or in a distributed fashion where different elements are spread across several interconnected information processing circuits. Any kind of information processing circuit—or other apparatus adapted for carrying out the methods described herein—is suited. A typical combination of hardware and software could be a general-purpose information processing circuit with a computer program that, when being loaded and executed, controls the information processing circuit such that it carries out the methods described herein.

The present invention can also be embedded in a computer program product, which comprises all the features enabling the implementation of the methods described herein, and which—when loaded in a information processing circuit—is able to carry out these methods. Computer program means or computer program in the present context mean any expression, in any language, code or notation, of a set of instructions intended to cause a system having an information processing capability to perform a particular function either directly or after either or both of the following a) conversion to another language, code or, notation; and b) reproduction in a different material form. Each information processing circuit may include, inter alia, one or more computers and at least a computer readable medium allowing a computer to read data, instructions, messages or message packets, and other computer readable information from the computer readable medium. The computer readable medium may include nonvolatile memory, such as ROM, Flash memory, Disk drive memory, CD-ROM, and other permanent storage. Additionally, a computer medium may include, for example, volatile storage such as RAM, buffers, cache memory, and network circuits.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method for content management, the method comprising:
   receiving, from a device, at least one request for at least one content, wherein the content is constructed from a plurality of content fragments, wherein each content fragment is associated with a plurality of content elements, wherein each content element is a variation of the content fragment, wherein each content element is a piece of reusable content across different context documents and is independent of a particular style sheet implementation;
   extracting at least one context related information from the request;
   generating a context document based on the context related information, wherein the context document includes content attributes of content elements within the plurality of content elements and the context document is used to map a set of variables in a style sheet to the content attributes of the content elements within the plurality of content elements;
   selecting for display on the device, a set of content elements from the plurality of content elements based on the set of variable mappings by identifying at least one content element from the set of content elements associated with content attributes that have been mapped to the set of variables in the style sheet;
   dynamically transforming the set of content elements that have been selected based on the set of variable mappings associated with the set of content elements, wherein the dynamically transforming is performed prior to processing the style sheet to generate an output document;
   creating a constraint document based on at least the context document and a device description document associated with the device that defines a set of features and capabilities of the device, and wherein the constraint document defines a set of constraints to set a form and style of each content element to be displayed on the device, wherein the constraint document is separate and distinct from the context document and the device description document; and
   generating an output document comprising the set of content elements that have been selected based upon the style sheet and the constraint document.

2. The method of claim 1, wherein the extracting comprises extracting the context related information for a particular user from within a request header of the request.

3. The method of claim 1, wherein the context related information comprises at least a device type.

4. The method of claim 1, wherein the extracting comprises determining the context related information based upon information for a session through which the request is received.

5. The method of claim 1, wherein the constraint document comprises at least one constraint imposed on an output document containing the content fragment and the element.

6. The method of claim 1, wherein the constraint document comprises at least one of constraints on a text portion, constraints on a graphics portion, form constraints, and style constraints.

7. The method of claim 1, wherein the extracting further comprises processing the context document in conjunction with external business rules.

8. The method of claim 1, further comprising transmitting the output document to the device.

9. The method of claim 1, further comprising:
   transmitting the output document to the device;
   receiving, from a second device, a second request for one content element;
   extracting at least one second context related information from the second request;
   selecting a second style sheet based upon the at least one second context related information;
   creating a second constraint document based on at least the second context related information and a second device description document associated with the second device that defines a set of features and capabilities of the second device, and wherein the second constraint document defines a second set of constraints that a second output document is required to satisfy so that the second output document can be displayed on the second device, including any special output feature of the second device;
   selecting one element from the set of elements based on the second constraint document, wherein the elements are variations of a same element of a fragment, wherein the second element is associated with a second content fragment, wherein the second content fragment is a piece of reusable content, that corresponds to a content element, and wherein each element is associated with a different display format; and
   generating the second output document based upon the second style sheet and the second element; and
   transmitting the second output document to the second device.

10. The method of claim 1, wherein the context related information comprises at least one of:
    at least one supported character encoding;
    a processing capacity;
    a display viewing area;
    a display type; and
    a device use.

11. A system for content management, the system comprising:
    a content storage that stores a plurality of content, wherein the content is constructed from a plurality of content fragments, wherein each content fragment is associated with a plurality of content elements, wherein each content element is a variation of the content fragment, wherein each content element is a piece of reusable content across different context documents and is independent of a particular style sheet implementation;
    a style sheet storage that stores at least one style sheet defining variables for content elements, wherein the style sheet is independent of each content element in the plurality of content elements;
    a content processor, communicatively coupled to the content storage and the style sheet storage, that is adapted to:
    receive, from a device, at least one request for at least one content in the plurality of content;

extract at least one context related information from the request;

generate a context document based on the context related information, wherein the context document includes content attributes of content elements within the plurality of content elements and the context document is used to map a set of variables in the style sheet to the content attributes of the content elements within the plurality of content elements;

select for display on the device, a set of content elements from the plurality of content elements based on the set of variable mappings by identifying at least one content element from the set of content elements associated with content attributes that have been mapped to the set of variables in the style sheet;

dynamically transform the set of content elements that have been selected based on the set of variable mappings associated with the set of content elements, wherein the dynamically transforming is performed prior to processing the style sheet to generate an output document;

create a constraint document based on at least the context document and a device description document associated with the device that defines a set of features and capabilities of the device, and wherein the constraint document defines a set of constraints to set a form and style of each content element to be displayed on the device, wherein the constraint document is separate and distinct from the context document and the device description document; and generate an output document comprising the set of content elements that have been selected based upon the style sheet and the constraint document.

12. The system of claim 11, wherein the context related information associated with the at least one device comprises a description of at least a device type.

13. The system of in claim 12, wherein the content server is adapted to transmit the output document to the device.

14. The system of claim 12, wherein the plurality of content comprises multiple reusable fragments.

15. The system of in claim 12, further comprising:
a plurality of devices comprising:
 a first device having a first context; and
 a second device having a second context;
wherein the content processor further:
 transmits the first output document to the first device;
 receives a second request for the at least one content element from a second device;
 extracts a second context related information from the second request;
 selects a second style sheet based on at least one information contained within the second context related information,
 creates a second constraint document based on at least the second context related information and a second device description document associated with the second device that defines a set of features and capabilities of the second device, and wherein the second constraint document defines a second set of constraints that a second output document is required to satisfy so that the output document can be displayed on the second device, including any special output feature of the second device;
 selects at least a second element from the set of elements based on the second constraint document, wherein the elements are variations of a same element of a fragment, wherein the second element is associated with a second content fragment, wherein the second content fragment is a piece of reusable content, that corresponds to a content element, and wherein each element is associated with a different display format; and
 generates the second output document using the second style sheet and the second element; and
 transmits the second output document to the second device.

16. The system of claim 11, wherein the constraint document comprises at least one constraint imposed on an output document containing the at least one content element.

17. The system of claim 11, wherein the constraint document comprises at least one of constraints on a text portion, constraints on a graphics portion, form constraints, and style constraints.

18. The system of claim 11, wherein the content processor is further adapted to process the context document in conjunction with external business rules.

19. The system of claim 11, wherein the context related information associated with the at least one device comprises a description of at least one of:
 at least one supported character encoding;
 a processing capacity;
 a display viewing area;
 a display type; and
 a device use.

20. A computer program product for content management, the computer program product comprising:
a non-transitory computer readable medium readable by an information processing circuit and storing instructions for execution by the information processing circuit for performing a method comprising:
 receiving, from a device, at least one request for at least one content, wherein the content is constructed from a plurality of content fragments, wherein each content fragment is associated with a plurality of content elements, wherein each content element is a variation of the content fragment wherein each content element is a piece of reusable content across different context documents and is independent of a particular style sheet implementation;
 extracting at least one context related information from the request;
 generating a context document based on the context related information, wherein the context document includes content attributes of content elements within the plurality of content elements and the context document is used to map a set of variables in a style sheet to the content attributes of the content elements within the plurality of content elements;
 selecting for display on the device, a set of content elements from the plurality of content elements based on the set of variable mappings by identifying at least one content element from the set of content elements associated with content attributes that have been mapped to the set of variables in the style sheet;
 dynamically transforming the set of content elements that have been selected based on the set of variable mappings associated with the set of content elements, wherein the dynamically transforming is performed prior to processing the style sheet to generate an output document;
 creating a constraint document based on at least the context document and a device description document associated with the device that defines a set of features and capabilities of the device, and wherein the constraint document defines a set of constraints to set a form and style of each content element to be displayed on the device, wherein the constraint document is separate and distinct from the context document and the device description document; and generating an output document comprising the set of content elements that have been selected based upon the style sheet and the constraint document.

21. The computer program product of claim 20, wherein the extracting comprises extracting the at least one context related information for a particular user from within a request header of the request.

22. The computer program product of claim 20, wherein the at least one context related information comprises at least a device type.

23. The computer program product of claim 20, wherein the extracting comprises determining the at least one context related information based upon information for a session through which the request is received.

24. The computer program product of claim 20, wherein the constraint document comprises at least one constraint imposed on an output document containing the at least one content element.

25. The computer program product of claim 20, wherein the constraint document comprises at least one of constraints on a text portion, constraints on a graphics portion, form constraints, and style constraints.

26. The computer program product of claim 20, wherein the extracting further comprises processing the context document in conjunction with external business rules.

27. The computer program product of claim 20, the method further comprising transmitting the output document to the device.

28. The computer program product of claim 20, the method further comprising:
 transmitting the output document content to the device;
 receiving, from a second device, a second request for the content element;
 extracting at least one second context related information from the second request;
 selecting a second style sheet from the at least one style sheet based upon the at least one second context related information;
 creating a second constraint document based on at least the second context related information and a second device description document associated with the second device that defines a set of features and capabilities of the second device, and wherein the second constraint document defines a second set of constraints that a second output document is required to satisfy so that the output document can be displayed on the second device, including any special output feature of the second device;
 selecting one element from the set of elements based on the second constraint document, wherein the elements are variations of a same element of a fragment, wherein the second element is associated with a second content fragment, wherein the second content fragment is a piece of reusable content, that corresponds to a content element, and wherein each element is associated with a different display format; and
 generating the second output document based upon the second style sheet and the second element; and
 transmitting the second output document to the second device.

29. The computer program product of claim 20, wherein the at least one context related information comprises at least one of:
 at least one supported character encoding;
 a processing capacity;
 a display viewing area;
 a display type; and
 a device use.

* * * * *